United States Patent
Newberry et al.

[11] Patent Number: 6,087,079
[45] Date of Patent: Jul. 11, 2000

[54] HIGH SPEED LAMINATION OF PAPER AND BIAXIALLY ORIENTED SHEET

[75] Inventors: Ann P. Newberry, Fairport; Peter T. Aylward, Hilton; Robert P. Bourdelais, Pittsford, all of N.Y.

[73] Assignee: Eastman Kodak Company, Rochester, N.Y.

[21] Appl. No.: 09/178,702

[22] Filed: Oct. 26, 1998

[51] Int. Cl.[7] .............................. G03C 1/765; G03C 1/79; G03C 1/93
[52] U.S. Cl. ..................... 430/510; 430/536; 430/538; 428/315.5; 428/315.9; 428/511; 428/513; 428/514
[58] Field of Search ..................... 430/536, 538, 430/510; 428/511, 513, 514, 315.5, 315.9

[56] References Cited

U.S. PATENT DOCUMENTS

| | | | |
|---|---|---|---|
| 3,454,419 | 7/1969 | Smith et al. | |
| 4,211,825 | 7/1980 | Shipman | 430/533 |
| 4,343,858 | 8/1982 | Thompson | 428/342 |
| 4,384,040 | 5/1983 | von Meer | 430/538 |
| 5,244,861 | 9/1993 | Campbell et al. | 430/201 |
| 5,290,672 | 3/1994 | Dunk | 430/538 |
| 5,466,519 | 11/1995 | Shirakura et al. | 430/538 |
| 5,476,708 | 12/1995 | Reed et al. | 430/538 |
| 5,866,282 | 2/1999 | Bourdelais et al. | 430/536 |
| 5,888,714 | 3/1999 | Bourdelais et al. | 430/536 |

*Primary Examiner*—Richard L. Schilling
*Attorney, Agent, or Firm*—Paul A. Leipolo

[57] ABSTRACT

The invention relates to a photographic element comprising a method of laminating paper and biaxially oriented polyolefin sheets comprising providing a biaxially oriented polyolefin sheet and a paper, bringing said sheet and paper together and simultaneously applying at least 2 layers of adhesive between said paper and said sheet, the layer of adhesive adjacent to said paper comprises an adhesive that has a 300 grams per 5 cm peel strength to said paper, and the layer of adhesive adjacent to said biaxially oriented sheet comprises an adhesive that has a 300 grams per 5 cm peel strength to the biaxially oriented sheet.

26 Claims, 1 Drawing Sheet

HIGH SPEED LAMINATION OF PAPER AND BIAXIALLY ORIENTED SHEET

FIELD OF THE INVENTION

This invention relates to imaging materials. In a preferred form it relates to photographic papers.

BACKGROUND OF THE INVENTION

In the formation of color photographic paper, a waterproof resin is melt extrusion coated on photographic grade cellulose paper. Polyethylene is commonly used and may be any one of a high density polyethylene, a low density polyethylene, a linear low density polyethylene, or a mixture of two or more of the above-mentioned polyethylenes.

It has been proposed in U.S. Pat. No. 5,244,861 to utilize biaxially oriented polypropylene laminated to cellulose grade paper for use as a reflective receiver for thermal dye transfer imaging process. The preferred bonding agent in U.S. Pat. No. 5,244,861, to bond the biaxially oriented polypropylene sheets to paper, is low density polyethylene melt extruded from a slit die. Because of the high processing temperatures required for LDPE, shrinkage of the biaxially oriented sheet is common in the melt extrusion process. Shrinkage can cause undesirable changes in the Poisson ratio of the laminated receiver, as well as a reduction in the optical performance of the receiver. It would be desirable to reduce the extrusion temperature of the bonding layer and maintain acceptable integrity of the laminated support.

While the preferred bonding agent in U.S. Pat. No. 5,244,861 provides an acceptable bond between the biaxially oriented polypropylene sheet and cellulose paper at machine speeds of 300 meters/min., at machine speeds exceeding 400 meters/min., the bond strength falls below an acceptable level for product performance. It would be desirable to have a melt extruded bonding layer that would provide sufficient adhesion to both biaxially oriented sheets and imaging base paper at speeds greater than 400 meters/min.

In U.S. application Ser. No. 08/998,161 (Bourdelais et al.) filed Dec. 24, 1997, now U.S. Pat. No. 5,888,714, white pigment such as $TiO_2$ added to the bonding layer has been proposed to improve photographic optical properties such as whiteness and opacity. In U.S. Pat. No. 5,476,708 (Reed et al.), it has been proposed that there exists an upper limit for pigment loading a polyolefin resin formulation because of manufacturing problems, such as melt extrusion die lines which significantly reduce the commercial value of imaging materials. It would be desirable to have a melt extruded bonding layer that could contain a high degree of $TiO_2$ to improve optical properties without melt extruded die lines.

In U.S. Pat. No. 4,339,507 (Kurtz et al.), linear low density ethylene hydrocarbon copolymers for extrusion coating are proposed to improve adhesion. While linear low density polyethylene (LLDPE) does improve adhesion when compared to low density polyethylene (LDPE), LLDPE suffers from a phenomena referred to as draw resonance. Draw resonance is defined as the instability of the melt flow and is manifested as thickness variation both in the cross and machine directions. Draw resonance is a function of machine speed, becoming worse at higher line speeds. As a result, the maximum line speed at which an acceptable photographic paper can be manufactured is restricted by the onset of draw resonance.

During the manufacturing process for biaxially oriented laminated photographic papers discussed in U.S. application Ser. No. 08/998,161 (Bourdelais et al.) filed Dec. 24, 1997, the laminated structure is subjected to various forces during manufacturing that will cause delamination of the biaxially oriented polyolefin sheet from the paper. The delamination may be a result of bonding layer failure to either the base paper or the polypropylene sheet. Also, when the photographic paper is being processed and finished at photofinishers, the laminated structure is also subjected to various forces in both the wet and dry state. Furthermore, when the photographic paper is kept for years by the final customer, the laminated structure is subjected to forces created by temperature and humidity changes that could cause delamination of the biaxially oriented polyolefin sheets from the cellulose paper base. Delamination of the biaxially oriented sheet from the paper during manufacturing will result in the product being wasted, thus increasing the cost of manufacture. Delamination of the biaxially oriented sheet from the paper at either the photo finishing operation or in the final customer format will result in a loss in the appearance of the image and the reduction of the value of the photograph. It would be desirable if a melt extruded bonding adhesive could prevent delamination of biaxially oriented sheets from the base paper during manufacture of a laminated imaging support and in the final customer format.

PROBLEM TO BE SOLVED BY THE INVENTION

There is a need for an improved method of laminating biaxially oriented polyolefin sheets and paper at high speeds with uniform lamination such that imaging members formed using the laminated material do not have defects caused by poor lamination such as delamination and poor photographic properties.

SUMMARY OF THE INVENTION

It is an object of the invention to overcome disadvantages of prior methods of laminating biaxially oriented polyolefin sheets and paper.

It is another object to provide a method to allow high speed lamination of paper and biaxially oriented polyolefin sheets.

It is a further object to provide improved laminated bases for imaging materials.

These and other objects of the invention are accomplished by a method of laminating paper and biaxially oriented polyolefin sheets comprising providing a biaxially oriented polyolefin sheet and providing a paper bringing said sheet and paper together and simultaneously applying at least 2 layers of adhesive between said paper and said sheet, the layer of adhesive adjacent to said paper comprises an adhesive that has a 300 grams per 5 cm peel strength to said paper, and the layer of adhesive adjacent to said biaxially oriented sheet comprises an adhesive that has a 300 grams per 5 cm peel strength to the biaxially oriented sheet.

ADVANTAGEOUS EFFECT OF THE INVENTION

The invention provides a method of laminating biaxially oriented polyolefin sheets and paper at high speed with uniform adhesion of said paper and sheets. Such laminates have particularly suitable properties for use as the base for imaging materials to provide particularly desirable high quality images.

DETAILED DESCRIPTION OF THE INVENTION

Figure 1:
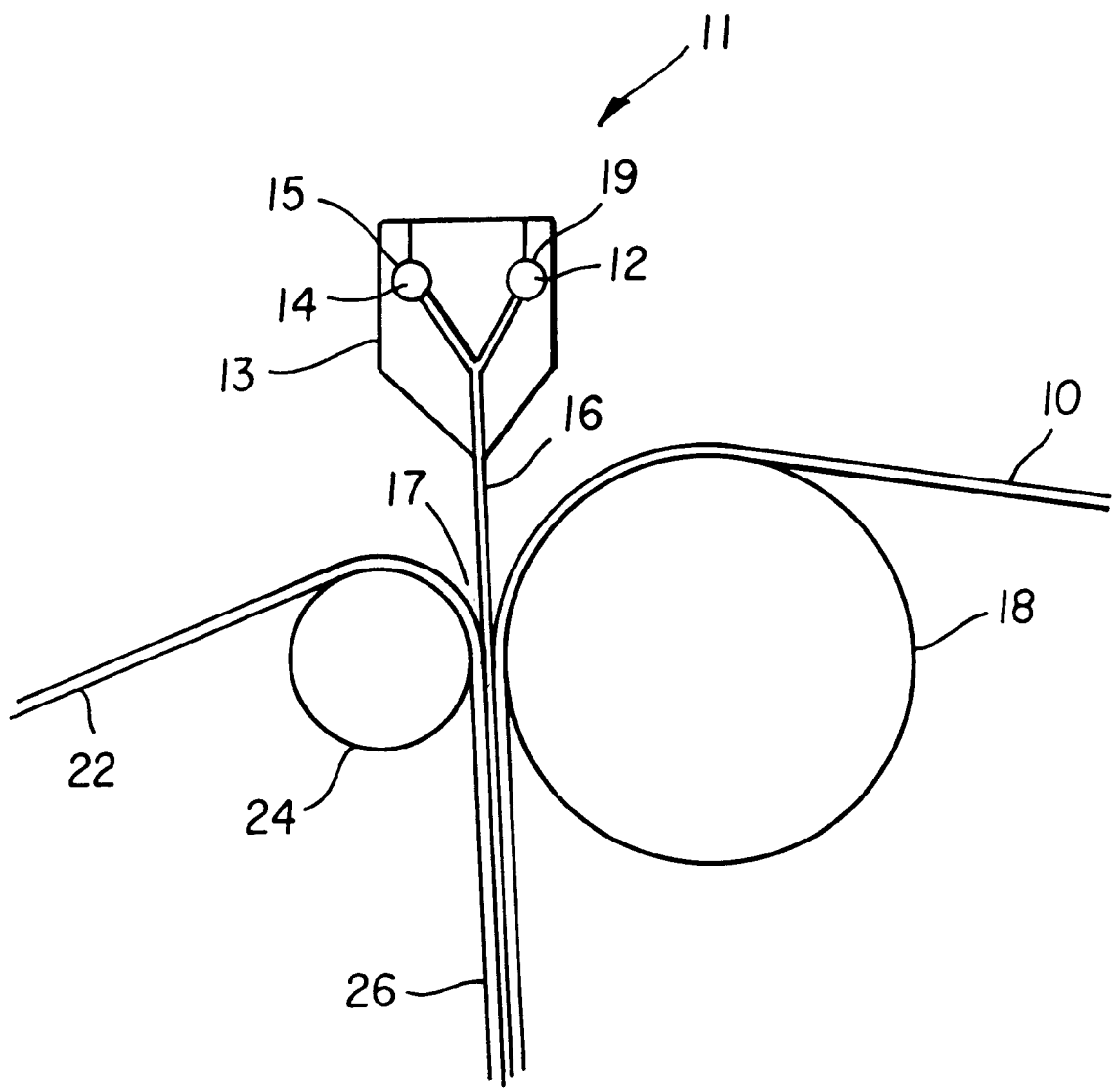

The invention has numerous advantages over prior practices in the art. The invention provides a laminated biaxially oriented polyolefin base for imaging use that does not delaminate. Further, in a preferred form it has a pigment layer which enhances imaging performance, particularly in silver halide photographic imaging. The method of the invention is low in cost, as it allows lamination at high speed resulting in more effective equipment use. Another advantage is that the adhesive layers may also act as a smoothing layer such that the roughness of the paper surface is not replicated to the surface of the sheet, thereby allowing a better image as the base where the image is formed is smoother. An advantage of the system is that when a pigment bearing layer is utilized between paper adhesive and sheet adhesive, this layer may be composed of low cost, recycled polymer, thereby lowering the cost of formation. These and other advantages will be apparent from the detailed description below.

FIG. 1 is a schematic side view of a two-layer coextruded laminator 11 showing a biaxially oriented sheet being melt coextruded laminated to a cellulose paper. Paper base 22 is conveyed into the lamination nip over pressure roll 24. The biaxially oriented sheet 10 is conveyed into the lamination nip over chilled roll 18. Adhesive resin 14 and adhesive resin 12 in chambers 15 and 19 are joined in a coextrusion die 13 to create a single melt curtain 16. The biaxially oriented sheet 10 is adhered to the paper base 22 when coextruded adhesive resins are applied in the nip 17. The composite structure 26 comprising the biaxially oriented sheet 10, the paper base 22, and the adhesive resins 14 and 12 then exit the lamination process. The process then is repeated to laminate a biaxially oriented polyolefin sheet to the other side of the paper base 22. If a three-layer adhesive is being applied, then the die 13 would be provided with another chamber, in addition to the two for resins 12 and 14.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. The terms "bonding layer", "adhesive layer", and "adhesive" mean one or more melt extruded resin layers between the biaxially oriented polyolefin sheets and the base paper.

Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The core of the preferred top side composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength, and it becomes more susceptible to physical damage.

The total thickness of the composite sheet can range from 12 to 100 $\mu$m, preferably from 20 to 70 $\mu$m. Below 20 $\mu$m, the microvoided sheets may not be thick enough to minimize any inherent non-planarity in the support and would be more difficult to manufacture. At thickness higher than 70 $\mu$m, little improvement in either surface smoothness or mechanical properties are seen, and so there is little justification for the further increase in cost for extra materials.

The biaxially oriented sheets of the invention preferably have a water vapor permeability that is less than $0.85 \times 10^{-4}$ g/mm$^2$/day/atm. This allows faster emulsion hardening, as the laminated support of this invention greatly slows the rate of water vapor transmission from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 $\mu$m in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells and, thus, there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH2)_nOH$ wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene, and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads, or inorganic particles such as clay, talc, barium sulfate, and calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. In the case of a multiple layer system, when different polymeric materials are used, an additional layer may be required to promote adhesion between non-compatible polymeric materials so that the biaxially oriented sheets do not have layer fracture during manufacturing or in the final imaging element format.

Addenda may be added to the core matrix and/or to the skins to improve the whiteness of these sheets. This would include any whitening process which is known in the art including adding a white pigment, such as titanium dioxide, barium sulfate, clay, or calcium carbonate. Other additives also include adding fluorescing agents which absorb energy in the UV region and emit light largely in the blue region, or other additives which would improve the physical properties of the sheet or the manufacturability of the sheet. For photographic use, a white base with a slight bluish tint is preferred.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers, while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma, or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a typical biaxially oriented, microvoided sheet to be bonded to a suitable photographic base paper is as follows:

| |
|---|
| solid skin layer |
| microvoided core layer |
| solid skin layer |

The sheet on the side of the base paper opposite to the emulsion layers may be any suitable sheet. The sheet may or may not be microvoided. It may have the same composition as the sheet on the top side of the paper backing material. Biaxially oriented sheets are conveniently manufactured by coextrusion of the sheet, which may contain several layers, followed by biaxial orientation. Such biaxially oriented sheets are disclosed in, for example, U.S. Pat. No. 4,764,425.

The preferred biaxially oriented sheet is a biaxially oriented polyolefin sheet, most preferably a sheet of polyethylene or polypropylene. The thickness of the biaxially oriented sheet should be from 10 to 150 µm. Below 15 µm, the sheets may not be thick enough to minimize any inherent non-planarity in the support and would be more difficult to manufacture. At thickness higher than 70 µm, little improvement in either surface smoothness or mechanical properties is seen, and so there is little justification for the further increase in cost for extra materials.

Suitable classes of thermoplastic polymers for the biaxially oriented sheet include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic, or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols, and mixtures thereof. Such polyesters are well known in the art and may be produced by well-known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the back side of the laminated base can be made with layers of the same polymeric material, or it can be made with layers of different polymeric composition. In the case of a multiple layer system when different polymeric materials are used, an additional layer may be required to promote adhesion between non-compatible polymeric materials so that the biaxially oriented sheets do not have layer fracture during manufacturing or in the final imaging element format.

Addenda may be added to the biaxially oriented back side sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The biaxially oriented sheet on the back side of the laminated base, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion, writability, or look to the support and photographic element. The biaxially oriented extrusion could be carried out with as many as 10 layers if desired to achieve some particular desired property.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and a coating of polyvinylidene chloride for heat seal properties. Further examples include flame, plasma or corona discharge treatment to improve printability or adhesion.

The structure of a typical biaxially oriented bottom sheet of the invention that may be bonded to photographic quality base paper where the solid layer is the side laminated to the paper is as follows:

treated skin layer
solid layer

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof. The base also may be a microvoided polyethylene terephalate such as disclosed in U.S. Pat. Nos. 4,912,333; 4,994,312; and 5,055,371. For a color photographic imaging element, photographic quality cellulose fiber paper is preferred.

The bonding agent used for bonding biaxially oriented sheets to either the top side or bottom side of cellulose photographic paper is preferably selected from a group of resins that can be melt extruded at about 160° C. to 300° C. Usually, a polyolefin resin such as polyethylene or polypropylene is used.

Adhesive resins are preferred for bonding biaxially oriented sheets to photographic grade cellulose paper. An adhesive resin used in this invention is one that can be melt extruded and provide sufficient bond strength between the cellulose paper and the biaxially oriented sheet. For use in the conventional photographic system, peel forces between the paper and the biaxially oriented sheets need to be greater than 150 grams/5 cm to prevent delamination during the manufacture of the photographic base, during processing of an image or in the final image format. "Peel strength" or "separation force" or "peel force" or "bond strength" is the measure of the amount of force required to separate the biaxially oriented sheets from the base paper. Bond failure may occur at the adhesive resin paper interface or at the adhesive resin biaxially oriented polyolefin sheet interface. Peel strength is measured using an Instron gauge and the 180 degree peel test with a cross head speed of 1.0 meters/min. The sample width is 5 cm, and the distance peeled is 10 cm.

Two or more adhesive layers are preferred to bond biaxially oriented sheets to base paper. In the case of a melt extruded single layer for bonding biaxially oriented sheets to paper, the adhesive resin must adequately bond to both the paper and the biaxially oriented sheets. Since cellulose paper and biaxially oriented sheets have very different surfaces and adhesion mechanics, many adhesive resins do not adequately adhere to both types of surfaces simultaneously, particularly at high speed. It is in the blend ratios and polymers combinations that the benefit of multilayer extrusion is realized. In addition, as the process line speed is increased to greater than 400 m/min. adhesion to the paper base, a single layer adhesive usually becomes unacceptable as defined by a modified version of TAPPI 539 cm-88 test method for 'Determination of polyethylene (resin) adhesion to porous substrates'. Two or more resin layers allow for different adhesive resin materials to be used, thus allowing for optimization of adhesion between one adhesive resin and biaxially oriented sheets and the second adhesive resin and the base paper. Optimization of adhesion for both the biaxially oriented sheets and the paper allows for lamination to be carried out at machine speeds higher than 400 meters/min. The structure of a typical multilayer adhesive resin system between biaxially oriented polyolefin sheets and suitable photographic base paper is as follows:

biaxially oriented sheet
1 adhesive resin
2 adhesive resin
photographic base paper In the case of silver halide photographic supports, suitable adhesive resins for bonding to the biaxially oriented sheets and bonding to cellulose paper must also not interact with the light sensitive emulsion layer. Examples of suitable adhesive resins are ionomer (e.g., an ethylene methacrylic acid copolymer cross-linked by metal ions such as Na ions or Zn ions), ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, ethylene methacrylic acid copolymer anhydride modified ethylene vinyl acetate, anhydride modified polyethylene, anhydride modified polypropylene, anhydride modified acid copolymers, anhydride modified ethylene acrylate copolymers, acid acrylate modified ethylene vinyl acetate, acid acrylate modified polyethylene, acid acrylate modified polypropylene, acid acrylate modified acid copolymers, acid acrylate modified ethylene acrylate copolymers, acid modified ethylene vinyl acetate, acid modified polyethylene, acid modified polypropylene, acid modified acid copolymers, or acid modified ethylene acrylate copolymers. These adhesive resins are preferred for single layer adhesive use because they can be easily melt extruded and provide peel forces between biaxially oriented polyolefin sheets and base paper greater than 300 grams/5 cm at machine speeds less than 400 meters/min. At machine speed greater than 400 meters/min. the above adhesive resins may adhere preferentially to the biaxially oriented sheets or to the base paper, while bonding more weakly to the less preferred material depending on the molecular weight of the resin, the melt index, and the nip pressure used in lamination. To determine the adhesion performance of the above materials, they need to be tested for adhesion at the desired manufacturing conditions including web width, nip pressure, and machine speed. The adhesive resins of this invention could also be used as a middle layer in the case of the coextruded three layer system, preferentially adhering to other adhesive resins at high speeds.

Metallocene catalyzed polyolefin plastomers are most preferred for bonding to biaxially oriented polyolefin sheets for high speed (greater than 400 m/min.) because they offer a combination of excellent adhesion to smooth biaxially oriented polyolefin sheets, are easily melt extruded using conventional coextrusion equipment, and are low in cost when compared to other adhesive resins. Metallocenes are a class of highly active catalysts that are used in the preparation of polyolefin plastomers. These catalysts, particularly those based on group IVB transition metals such as zirconium, titanium, and hafnium, show extremely high activity in ethylene polymerization. Various forms of the catalyst system of the metallocene type may be used for polymerization to prepare the polymers used for bonding biaxially oriented polyolefin sheets to cellulose paper. Forms of the catalyst system include, but are not limited to, those of homogeneous, supported catalyst type, high pressure process or a slurry or a solution polymerization process. The metallocene catalysts are also highly flexible in that, by manipulation of catalyst composition and reaction conditions, they can be made to provide polyolefins with controllable molecular weights. Suitable polyolefins include polypropylene, polyethylene, polymethylpentene, polystyrene, polybutylene, and mixtures thereof. Development of these metallocene catalysts for the polymerization of ethylene is found in U.S. Pat. No. 4,937,299 (Ewen et al.).

The most preferred metallocene catalyzed copolymers for bonding to biaxially oriented sheets at high speeds are very low density polyethylene (VLDPE) copolymers of ethylene and a $C_4$ to $C_{10}$ alpha monolefin, most preferably copolymers and terpolymers of ethylene and butene-1 and hexene-1. The melt index of the metallocene catalyzed ethylene plastomers preferably fall in a range of 2.5 g/10 min to 27 g/10 min. The density of the metallocene catalyzed ethylene plastomers preferably falls in a range of 0.8800 to 0.9100. Metallocene catalyzed ethylene plastomers with a density greater than 0.9200 do not provide sufficient adhesion to biaxially oriented polyolefin sheets for high speed lamination.

Melt extruding metallocene catalyzed ethylene plastomers present some processing problems. Processing results from earlier testing in food packaging applications indicated that their coating performance, as measured by the neck-in to draw-down performance balance, was worse than conventional low density polyethylene making the use of metallocene catalyzed plastomers difficult in a single layer melt extrusion process that is typical for the production of current photographic support. By blending low density polyethylene with the metallocene catalyzed ethylene plastomer, acceptable melt extrusion coating performance was obtained making the use of metallocene catalyzed plastomers blended with low density polyethylene (LDPE) very efficient. The preferred level of low density polyethylene to be added is dependent on the properties of the LDPE used (properties such as melt index, density, and type of long chain branching) and the properties of the metallocene catalyzed ethylene plastomer selected. Since metallocene catalyzed ethylene plastomers are more expensive than LDPE, a cost to benefit trade-off is necessary to balance material cost with processing advantages such as neck-in and product advantages, such as biaxially oriented film adhesion to paper. In general the preferred range of LDPE blended is 10% to 80% by weight.

Anhydride modified ethylene acrylate is most preferred for bonding to photographic grade cellulose paper because it offers a combination of excellent adhesion to photographic quality cellulose paper and is easily melt coextruded using conventional extrusion equipment and is low in cost when compared to other adhesive resins which provide an acceptable bond to cellulose paper.

Both bonding layers may also contain pigments which are known to improve the imaging responses such as whiteness or sharpness. Pigments such as talc, kaolin, $CaCO_3$, $BaSO_4$, ZnO, $TiO_2$, ZnS, and $MgCO_3$ can be used to improve imaging responses. Titanium dioxide is preferred and is used in this invention to improve image sharpness. The $TiO_2$ used may be either anatase or rutile type. In the case of whiteness, anatase is the preferred type. In the case of sharpness, rutile is the preferred. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$.

When two or more resin bonding layers of the invention are used, the weight percent of pigments to improve imaging optical properties can be increased over traditional mono layer systems without melt extrusion die lines. Prior art photographic supports suffer from die lines when $TiO_2$ is melt extruded from a slit die. Over time the $TiO_2$ builds up on the die lips causing unacceptable die lines to appear on the surface of the support. By using a multiple layer adhesive resin bonding system, the pigment weight percent of $TiO_2$ can be increased over traditional mono layer bonding systems by adding pigments in a core layer of a three-layer or more multiple layer system, thus avoiding $TiO_2$ contact with melt extrusion die surfaces. The preferred loading of $TiO_2$ in the resin layers is between 15% and 60% by weight. Below 12% $TiO_2$ loading, mono layer adhesive resins can be used without significant die line problems. Above 70% many melt flow problems are encountered which would significantly reduce the commercial value of the imaging support and reduce the efficiency of the extrusion process.

The structure of a preferred multilayer adhesive resin system, suitable for high speed coating, containing white pigment between biaxially oriented polyolefin sheets and suitable photographic base paper when the imaging layers are coated on the top biaxially oriented sheet is as follows:

imaging layers
top biaxially oriented sheet
metallocene catalyzed ethylene adhesive
low density polyethylene adhesive with $TiO_2$
anhydride modified ethylene acrylate adhesive
photographic base paper The bonding layers may also contain addenda known in the art to absorb light. A light absorbing layer in this invention is used to improve optical properties of an image, such as opacity and image resolution. An example of a light absorbing material that can be added to the bonding layer is an extrusion grade of carbon black. Carbon black addenda is produced by the controlled combustion of liquid hydrocarbons and can be added to the bonding layers prior to melt extrusion.

In the manufacturing process for this invention, the preferred method for melt extruding two or more layers is melt coextrusion from a slit die. Coextrusion is a process that provides for more than one extruder to simultaneously pump molten polymer out through a die in simultaneous, yet discrete layers. This is accomplished typically through the use of a multimanifold feedblock which serves to collect the hot polymer, keeping the layers separated until the entrance to the die where the discrete layers are pushed out between the sheet and paper to adhere them together. Coextrusion lamination is typically carried out by bringing together the biaxially oriented sheet and the base paper with application of the bonding agent between the base paper and the biaxially oriented sheet, followed by their being pressed together in a nip such as between two rollers.

The total thickness of the adhesive bonding layer adjacent to cellulose paper can range from 0.5 µm to 25 µm, preferably from 1 µm to 12 µm. Below 1 µm it is difficult to maintain a consistent melt extruded bonding layer thickness over the entire web width. At thickness higher than 14 µm there is little improvement in biaxially oriented sheet adhesion to paper.

The total thickness of the adhesive bonding layer adjacent to biaxially oriented sheet can range from 0.5 µm to 25 µm, preferably from 1 µm to 12 µm. Below 1 µm it is difficult to maintain a consistent melt extruded bonding layer thickness over the entire web width. At thickness higher than 14 µm there is little improvement in biaxially oriented sheet adhesion to paper.

As used herein, the phrase "imaging element" is a material that may be used as a laminated support for the transfer of images to the support by techniques, such as ink jet printing or thermal dye transfer, as well as a support for silver halide images. As used herein, the phrase "photographic element" is a material that utilizes photosensitive silver halide in the formation of images. In the case of thermal dye transfer or ink jet, the image layer that is coated on the imaging element may be any material that is known in the art such as gelatin, pigmented latex, polyvinyl alcohol, polycarbonate, polyvinyl pyrrolidone, starch, and methacrylate. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate, and allyl thiourea; reducing agents, e.g., polyamines and stannous salts; noble metal compounds, e.g., gold and platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives, tin compounds, polyamine compounds, and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure*, September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 μm.

The laminated base materials of the invention may be used in the photographic elements as described in *Research Disclosure* 40145 of September 1997. The couplers of Section II and the color paper structures of Sections XVI–XVIII are particularly suitable.

In the following Table, reference will be made to (1) *Research Disclosure*, December 1978, Item 17643; (2) *Research Disclosure*, December 1989, Item 308119; and (3) *Research Disclosure*, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing, and manipulating the elements, and the images contained therein.

| Reference | Section | Subject Matter |
|---|---|---|
| 1 | I, II | Grain composition, morphology |
| 2 | I, II, IX, X, XI, XII, XIV, XV | and preparation. Emulsion preparation including hardeners, |
|   | I, II, III, IX | coating aids, addenda, etc. |
| 3 | A & B |   |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI |   |
| 1 | VI |   |
| 2 | VI | Antifoggants and stabilizers |
| 3 | VII |   |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII |   |
| 2 | XVII | Supports |
| 3 | XV |   |
| 3 | XI | Specific layer arrangements |
| 3 | XII, XIII | Negative working emulsions; Direct positive emulsions |
| 2 | XVIII | Exposure |
| 3 | XVI |   |
| 1 | XIX, XX | Chemical processing; |
| 2 | XIX, XX, XXII, | Developing agents |
| 3 | XVIII, XIX, XX |   |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The laminated base of the invention may be utilized as a substitute for the paper base of the papers in Sections XVI–XX of *Research Disclosure* 40145 of September 1997. The couplers of Section II of RD 40145 also may be used with laminated base of the invention.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The laminated substrate of the invention may have copy restriction features incorporated such as disclosed in U.S. patent application Ser. No. 08/598,785 filed Feb. 8, 1996 and application Ser. No. 08/598,778 filed on the same day. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the back side to enable users or machines to read and identify the media. The media may take the form of sheets that are capable of bearing an image. Typical of such materials are photographic paper and film materials composed of polyethylene resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support, and pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial, and spectral exposure of the photosensitive materials to visible or non-visible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in *Research Disclosure* 37038 of February 1995.

While this invention has been discussed with respect to photographic elements, it also could be used as a substrate for imaging material such as ink jet, thermal dye transfer, and electrophotographic reflective output.

The following examples illustrate the practice of this invention. They are not intended to be exhaustive of all possible variations of the invention. Parts and percentages are by weight unless otherwise indicated.

COMMERCIAL GRADE PAPER OF EXAMPLES

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

Example 1

The following laminated photographic bases are prepared by extrusion laminating the following sheets to both sides of a photographic grade cellulose paper base:
Top sheet: (emulsion side)
OPPalyte 350 ASW (Mobil Chemical Co.)

A composite sheet (31 μm thick) (d=0.68 g/cc) consisting of a microvoided and oriented polypropylene core (approximately 60% of the total sheet thickness), with a homopolymer non-microvoided oriented polypropylene layer on each side; the void initiating material used is poly(butylene terephthalate).
Bottom sheet: (Back side)
BICOR 70 MLT (Mobil Chemical Co.)

A one-side matte finish, one-side treated biaxially oriented sheet (18 μm thick) (d=0.90 g/cc) consisting of a solid oriented polypropylene core. The matte finish side is toward the bottom and consists of a skin layer of a mixture of polyethylenes and a terpolymer of ethylene-propylene and butylene.

The photographic bases in Table 1 were the result of using multilayer coextrusion of polymers to adhere the bottom biaxially oriented sheets to the paper base. To adhere the top biaxially oriented sheet to the paper, a metallocene catalyzed ethylene plastomer (Exxon SLP 9088) was used and held constant in this example. The bottom resin adhesive bonding layer materials used in this example were:
Low Density Polyethylene:
1924P Low Density Polyethylene (Eastman Chemical Co.)

An extrusion grade low density polyethylene with a melt index of 4.2 and a density of 0.925 g/cc.
Metallocene catalyzed ethylene plastomer:
SLP-9088 Ethylene-Olefin Copolymer (Exxon Chemical Co.)

A metallocene catalyzed ethylene based hexene copolymer with a density of 0.900 grams/cm$^3$ and a melt index of 16.5.
Maleic Anhydride Grafted Copolymer:
Bynel 2169 anhydride-modified Ethylene Acrylate (DuPont Chemical Co.)

A maleic anhydride grafted ethyl methyl methacrylate copolymer with a melt index of 6.5.
Blend A:
100% polymer blend consisting of 60% by weight of 1924P and 40% by weight of SLP9088.

The support structure of this example is as follows:

---

OPPalyte 350 ASW
Metallocene catalyzed ethylene plastomer
Cellulose base Paper
Paper adhesive resin layer (at paper)
Coextruded low density polyethylene (middle)
Sheet adhesive resin layer (at sheet)
BICOR 70 MLT

---

The extrusion resin layer composition in Table 1 lists the adhesive resin combinations used to bond the bottom biaxially oriented sheet to the paper using a coextruded three-layer system. Samples A–F are control samples, as they use low density polyethylene that is typically used in prior art photographic bases. Samples G–L relate to this invention, as they use multiple layers of coextruded adhesive resins that preferentially adhere to either the paper base or the biaxially oriented sheet.

TABLE 1

| Sample Number | Extrusion Resin Layer Composition | | | Linespeed (m/min) | Bonding Layer Thickness (microns) | | |
|---|---|---|---|---|---|---|---|
| | At Paper | Middle | At Sheet | | At Paper | Middle | At Sheet |
| A | 1924P | 1924P | 1924P | 300 | 10.24 | 5.96 | 12.80 |
| B | 1924P | 1924P | 1924P | 400 | 10.24 | 5.96 | 12.80 |

TABLE 1-continued

| Sample Number | Extrusion Resin Layer Composition | | | Linespeed (m/min) | Bonding Layer Thickness (microns) | | |
|---|---|---|---|---|---|---|---|
| | At Paper | Middle | At Sheet | | At Paper | Middle | At Sheet |
| C | 1924P | 1924P | 1924P | 450 | 10.24 | 5.96 | 12.80 |
| D | 1924P | 1924P | 1924P | 300 | 10.24 | 5.96 | 12.80 |
| E | 1924P | 1924P | 1924P | 400 | 10.24 | 5.96 | 12.80 |
| F | 1924P | 1924P | 1924P | 450 | 10.24 | 5.96 | 12.80 |
| G | Blend A | 1924P | Blend A | 300 | 3.41 | 20.47 | 6.40 |
| H | Blend A | 1924P | Blend A | 400 | 3.41 | 20.47 | 6.40 |
| I | Blend A | 1924P | Blend A | 500 | 3.41 | 20.47 | 6.40 |
| G | 2169 | 1924P | Blend A | 300 | 3.41 | 20.47 | 6.40 |
| H | 2169 | 1924P | Blend A | 400 | 3.41 | 20.47 | 6.40 |
| L | 2169 | 1924P | Blend A | 500 | 3.41 | 20.47 | 6.40 |

The photographic bases in Table 1 are prepared by coextrusion coating the adhesion layer (which ties together the biaxially oriented polyolefin sheet and the cellulose photographic grade paper) using a multilayer feedblock allowing materials from three different extruders to enter a slit die in discrete layers which are then simultaneously coated between the sheet and the paper. The materials used and their thickness ratios are listed in the Table 1. The extrusion resin layer composition depicts the discrete resin layers in the three layer coextruded adhesion where 'at paper' is the layer specialized for adhesion to paper, 'middle' is the low cost layer which helps physically support the outer two layers, and 'at sheet' is the layer specialized for adhesion to the sheet. Line speed is in the chart to show how adhesion is affected as the process is run faster. Melt temperature is the temperature of the melted polymer as it exits each individual extruder prior to entering the feedblock. Bonding layer thickness is the thickness of each discrete polymer layer after it has been cooled to room temperature between the sheet and paper. Peel strength is a measurement of the difficulty of separation between the adhesion layer and the cellulose photographic grade paper and the adhesion layer and biaxially oriented polyolefin sheet. The former is measured qualitatively through a visual test (a modified version of TAPPI 539 cm-88 test method for 'Determination of polyethylene resin adhesion to porous substrates') whereby the presence of cellulose fiber adhered to the adhesion polymer layer after separation is referred to as fiber tear, and a lack thereof is referred to as no fiber tear or in the table as 'no' which is unacceptable for this product. The latter peel strength is measured in grams/5 cm, and represents the separation force between the adhesion layer and biaxially oriented polyolefin sheet. The separation force is measured using an Instron machine 180 degree peel test with a crosshead speed of 1.0 meter per minute. The sample width is 5 cm, and the distance peeled is 10 cm. The peel strength readings in Table I are an average of 9 individual readings.

TABLE 2

| Sample | Fiber Tear | Sheet Peel Strength (grams) |
|---|---|---|
| A | Yes | 87 |
| B | No | 87 |
| C | No | 87 |
| D | Yes | 87 |
| E | No | 87 |
| F | No | 87 |
| G | Yes | 316 |
| H | No | 316 |
| I | No | 316 |
| J | Yes | 316 |
| K | Yes | 316 |
| L | Yes | 316 |

The data in Table 2 show that when biaxially oriented polyolefin sheets are laminated to cellulose photographic grade paper using a multilayer coextrusion technique, whereby a maleic anhydride ethyl methyl methacrylate polymer is at the paper interface (samples J, K, and L) and a polyolefin copolymer blend with low density polyethylene is at the sheet interface (samples G through I), the adhesion between layers is improved compared to control samples A–F. Additionally, when the resin adhesive materials are optimized to preferentially adhere to the base paper and the biaxially oriented sheet (samples J, K and L) paper fiber tear, which is typically the maximum bond strength, was achieved compared to samples (G–I) where a single adhesive resin was used. Further samples G–L were able to be laminated at 500 meters/min. with acceptable bond strength between the base paper and the biaxially oriented sheet compared to samples A–F. An increase in machine speed allows the imaging base of this invention to be made at lower cost compared to prior art monolayer melt extruded lamination resin materials.

Example 2

The following laminated photographic bases are prepared by extrusion laminating the following sheets to both sides of a photographic grade cellulose paper base:
Top sheet: (emulsion side)
OPPalyte 350 ASW (Mobil Chemical Co.)
A composite sheet (31 μm thick) (d=0.68 g/cc) consisting of a microvoided and oriented polypropylene core (approximately 60% of the total sheet thickness), with a homopolymer non-microvoided oriented polypropylene layer on each side; the void initiating material used is poly(butylene terephthalate).
Bottom sheet: (Back side)
BICOR 70 MLT (Mobil Chemical Co.)
A one-side matte finish, one-side treated biaxially oriented sheet (18 μm thick) (d=0.90 g/cc) consisting of a solid oriented polypropylene core. The matte finish side is toward the bottom and consists of a skin layer of a mixture of polyethylenes and a terpolymer of ethylene-propylene and butylene.

The photographic bases in Table 1 are the result of using multilayer coextrusion of polymers to adhere the top sheet to the paper base. The adhesive resin used to bond the bottom sheet to the paper was a metallocene catalyzed ethylene plastomer and was held constant in this example. The resin adhesive bonding layer materials used to bond the top sheet to the cellulose base paper are:

Low Density Polyethylene:
1924P Low Density Polyethylene (Eastman Chemical Co.)
An extrusion grade low density polyethylene with a melt index of 4.2.

$TiO_2$ Color Concentrate:
Masterbatch produced with low density 1924P polyethylene as the carrier resin and DuPont R104 rutile $TiO_2$.

The support structure of this example, where the OPPalyte 350 ASW is the on side toward the imaging layers, was as follows:

OPPalyte 350 ASW
Metallocene catalyzed ethylene
Low density polyethylene with $TiO_2$
Metallocene catalyzed ethylene
Cellulose base Paper
Metallocene catalyzed ethylene
BICOR 70 MLT

TABLE 3

| Sample Number | TiO2 Weight % | | | Linespeed (m/min) | Bonding Layer Thickness (microns) | | |
|---|---|---|---|---|---|---|---|
| | At Paper | Middle | At Sheet | | At Paper | Middle | At Sheet |
| A | 4% | 12% | 4% | 300 | 5.00 | 10.00 | 5.00 |
| B | 4% | 18% | 4% | 300 | 5.00 | 10.00 | 5.00 |
| C | 4% | 24% | 4% | 300 | 5.00 | 10.00 | 5.00 |

The photographic bases in Table 3 were prepared by coextrusion coating the adhesion layer (which ties together the biaxially oriented polyolefin sheet and the cellulose photographic grade paper) using a multilayer feedblock allowing materials from three different extruders to enter a slit die in discrete layers which are then simultaneously coated between the sheet and the paper. The materials used and their thickness ratios are listed in Table 3. The extrusion resin layer composition depicts the discrete resin layers in the three layer coextruded adhesion where 'at paper' is the layer specialized for adhesion to paper, 'middle' is the $TiO_2$ loaded layer for optical enhancement of the biaxially oriented polyolefin sheet, and 'at sheet' is the layer specialized for adhesion to the sheet. The $TiO_2$ loading of 12% for sample A was used as a control, as 12% $TiO_2$ is a typical $TiO_2$ loading in photographic supports. Bonding layer thickness is the thickness of each discrete polymer layer after it has been cooled to room temperature between the sheet and paper.

Support samples A–C were measured for opacity and L*. These optical ratings are the standard of color measurement in the CIE system measured on a Hunterlab calorimeter. For most imaging supports, high opacity and L* are preferred.

TABLE 4

| Sample | Opacity | L* |
|---|---|---|
| A | 93.1 | 93.2 |
| B | 94.9 | 93.9 |
| C | 95.8 | 94.6 |

Optical results in Table 4 show that by increasing the $TiO_2$ weight % from the 12% used in control sample A to 24% in sample C improvements in both support opacity and support lightness are achieved. While beneficial effect of TiO2 weight % and optical performance is well known in the art, because the $TiO_2$ weight percents were achieved in the middle layer and not the two outer layers that are in contact with the die lips that is typical of prior art materials, no extrusion die lines were observed. Extrusion die lines typically prevent $TiO_2$ loadings higher than 12%. $TiO_2$ weight % greater than 12% without extrusion die lines in manufacturing is significant in that improvements in image quality are now possible with higher $TiO_2$ weight % without reducing manufacturing efficiency, decreasing image quality and increasing manufacturing waste in the support manufacturing process.

The invention has been described in detail with particular reference to certain preferred embodiments thereof, but it will be understood that variations and modifications can be effected within the spirit and scope of the invention.

What is claimed is:

1. An imaging element comprising a base paper and a top and a bottom biaxially oriented polyolefin sheet, wherein at least one of said top or bottom biaxially oriented polyolefin sheet is joined to said paper by one layer of adhesive adjacent said paper that has a binding strength to paper of at least 300 grams per 5 cm peel strength and one adhesive layer of adhesive adjacent to said biaxially oriented polyolefin sheet that has a binding strength to biaxially oriented polyolefin sheet of at least 300 grams per 5 cm wherein said adhesive adjacent said paper and said adhesive adjacent at least one of said polyolefin sheets are separate layers of different composition.

2. The imaging element of claim 1 wherein said layer of adhesive adjacent to said paper comprises at least one member selected from the group consisting of metallocene catalyzed polyolefin plastomers, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, ethylene methacrylic acid copolymer, anhydride modified ethylene vinyl acetate, anhydride modified polyethylene, anhydride modified polypropylene, anhydride modified acid copolymers, anhydride modified ethylene acrylate copolymers, acid acrylate modified ethylene vinyl acetate, acid acrylate modified polyethylene, acid acrylate modified polypropylene, acid acrylate modified acid copolymers, acid acrylate modified ethylene acrylate copolymers, acid modified ethylene vinyl acetate, acid modified polyethylene, acid modified polypropylene, acid modified acid copolymers, or acid modified ethylene acrylate copolymers.

3. The imaging element of claim 1 wherein said layer of adhesive adjacent to said sheet comprises at least one member selected from the group consisting of metallocene catalyzed polyolefin plastomers, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, ethylene methacrylic acid copolymer, anhydride modified ethylene vinyl acetate, anhydride modified polyethylene, anhydride modified polypropylene, anhydride modified acid copolymers, anhydride modified ethylene acrylate copolymers, acid acrylate modified ethylene vinyl acetate, acid acrylate modified polyethylene, acid acrylate modified polypropylene, acid acrylate modified acid copolymers, acid acrylate modified ethylene acrylate copolymers, acid modified ethylene vinyl acetate, acid modified polyethylene, acid modified polypropylene, acid modified acid copolymers, or acid modified ethylene acrylate copolymers.

4. The imaging element of claim 1 wherein said layer of adhesive adjacent to said paper comprises anhydride modified ethylene acrylate.

5. The imaging element of claim 1 wherein said layer of adhesive adjacent to said sheet comprises metallocene catalyzed polyolefin plastomers.

6. The imaging element of claim 1 wherein said sheet comprises a biaxially oriented polyolefin with two or more layers.

7. The imaging element of claim 1 wherein said paper comprises a photographic base paper having a surface roughness less than 0.58 µm.

8. The imaging element of claim 1 wherein there is provided at least one polymer layer between said adhesive layers.

9. The imaging element of claim 8 wherein said polymer layer comprises a white pigment or dye.

10. The imaging element of claim 9 wherein said white pigment comprises titanium dioxide in an amount of between about 15 and 60 percent.

11. A photographic element comprising, at least one layer comprising photosensitive silver, a base paper, and a top and a bottom biaxially oriented polyolefin sheet, wherein at least one of said top or bottom biaxially oriented polyolefin sheet is joined to said paper by one layer of adhesive adjacent said paper that has a binding strength to paper of at least 300 grams per 5 cm peel strength and one adhesive layer of adhesive adjacent to said biaxially oriented polyolefin sheet that has a binding strength to biaxially oriented polyolefin sheet of at least 300 grams per 5 cm wherein said adhesive adjacent said paper and said adhesive adjacent at least one of said polyolefin sheets are separate layers of different composition.

12. The photographic element of claim 11 wherein said layer of adhesive adjacent to said paper comprises at least one member selected from the group consisting of metallocene catalyzed polyolefin plastomers, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, ethylene methacrylic acid copolymer, anhydride modified ethylene vinyl acetate, anhydride modified polyethylene, anhydride modified polypropylene, anhydride modified acid copolymers, anhydride modified ethylene acrylate copolymers, acid acrylate modified ethylene vinyl acetate, acid acrylate modified polyethylene, acid acrylate modified polypropylene, acid acrylate modified acid copolymers, acid acrylate modified ethylene acrylate copolymers, acid modified ethylene vinyl acetate, acid modified polyethylene, acid modified polypropylene, acid modified acid copolymers, or acid modified ethylene acrylate copolymers.

13. The photographic element of claim 11 wherein said layer of adhesive adjacent to said sheet comprises at least one member selected from the group consisting of metallocene catalyzed polyolefin plastomers, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, ethylene methacrylic acid copolymer, anhydride modified ethylene vinyl acetate, anhydride modified polyethylene, anhydride modified polypropylene, anhydride modified acid copolymers, anhydride modified ethylene acrylate copolymers, acid acrylate modified ethylene vinyl acetate, acid acrylate modified polyethylene, acid acrylate modified polypropylene, acid acrylate modified acid copolymers, acid acrylate modified ethylene acrylate copolymers, acid modified ethylene vinyl acetate, acid modified polyethylene, acid modified polypropylene, acid modified acid copolymers, or acid modified ethylene acrylate copolymers.

14. The photographic element of claim 11 wherein said layer of adhesive adjacent to said paper comprises anhydride modified ethylene acrylate.

15. The photographic element of claim 11 wherein said layer of adhesive adjacent to said sheet comprises metallocene catalyzed polyolefin plastomers.

16. The photographic element of claim 11 wherein said sheet comprises a biaxially oriented polyolefin with two or more layers.

17. The photographic element of claim 11 wherein said paper comprises a photographic base paper having a surface roughness less than 0.58 µm.

18. The photographic element of claim 11 wherein there is provided at least one polymer layer between said adhesive layers.

19. A photographic element comprising, at least one layer comprising photosensitive silver, a base paper, and a top and a bottom biaxially oriented polyolefin sheet, wherein at least one of said top or bottom biaxially oriented polyolefin sheet is joined to said paper by one layer of adhesive adjacent said paper that has a binding strength to paper of at least 300 grams per 5 cm peel strength and one adhesive layer of adhesive adjacent to said biaxially oriented polyolefin sheet that has a binding strength to biaxially oriented polyolefin sheet of at least 300 grams per 5 cm wherein there is provided at least one polymer layer between said adhesive layers.

20. The photographic element of claim 19 wherein said polymer layer comprises a pigment or dye.

21. The photographic element of claim 20 wherein said pigment comprises titanium dioxide in an amount of between about 15 and 60 percent.

22. The photographic element of claim 19 wherein said adhesive adjacent said paper and said adhesive adjacent at least one of said polyolefin sheets are separate layers of different composition.

23. The photographic element of claim 11 wherein said adhesive adjacent at least one of said polyolefin sheets comprises an adhesive specialized for adhesion to polyolefin sheet.

24. The photographic element of claim 23 wherein said adhesive adjacent to paper is specialized for adhesion to paper.

25. The imaging element of claim 1 wherein said adhesive adjacent at least one of said polyolefin sheets comprises an adhesive specialized for adhesion to polyolefin sheet.

26. The imaging element of claim 25 wherein said adhesive adjacent to paper is specialized for adhesion to paper.

* * * * *